United States Patent

Inose et al.

[15] 3,694,580

[45] Sept. 26, 1972

[54] TIME DIVISION SWITCHING SYSTEM

[72] Inventors: Hiroshi Inose; Tadao Saito, both of Tokyo, Japan

[73] Assignee: Bell Telephone Laboratories, Incorporated, Murray Hill, N.J.

[22] Filed: July 28, 1971

[21] Appl. No.: 166,927

[52] U.S. Cl........179/15 AQ, 179/15 AT, 340/166 R

[51] Int. Cl...............................................H04j 3/00

[58] Field of Search... 179/15 AT, 15 AL, 15 AQ, 18 GE, 179/18 J; 340/166 R

[56] References Cited

UNITED STATES PATENTS 3,644,679 2/1972 Tallegas................179/15 AQ

*Primary Examiner*—Ralph D. Blakeslee

*Attorney*—R. J. Guenther and R. B. Ardis

[57] ABSTRACT

A time division switching system includes first and second groups of time division buses and a crosspoint network for interconnecting the buses of the first group to the buses of the second group. On each time division bus, interleaved PCM codes are transmitted in a plurality of *m* time slots. Each time slot is divided into a plurality of bit intervals and each bit interval is divided into *n* positions whereby *n* interleaved PCM codes are transmitted in each time slot. A control circuit operates to selectively enable the crosspoint gates to transfer PCM code bits from the first group buses to the second group buses in each position. A control memory is provided for each path of the group having the lesser number of paths. Control codes are stored in the memory, each of which determines the operation of the gates connected to the path associated with the memory during a time slot. Each memory has a capacity corresponding to the number of paths in the group having the greater number of paths multiplied by *m n*.

13 Claims, 12 Drawing Figures

TIME DIVISION SWITCHING SYSTEM

Our invention is related to communication systems, more particularly to time division switching systems, and more particularly to control memory arrangements useful in time division switching systems.

Communication systems utilizing time division multiplexing operate on a time separation basis in which a number of communication channels share a common transmission path. Non-interference of communications is insured in such systems by separation of individual channels in time. Thus each channel is assigned to the common path for extremely short but rapidly and periodically recurring intervals and the connection between two stations is completed only during these short intervals termed "time slots"Samples samples which retain the essential characteristics of the signal transmitted over the common path in these time slots are used at the destination station to reconstruct the original signal so that the reception of signals of any complexity through the time division network is satisfactory.

A further refinement introduced into time multiplex communications systems is the coding of each signal sample typically by pulse code modulation (PCM). The signal is first sampled at a sampling rate which is at least twice the bandwidth of the signal to be transmitted. If the transmission rate is 4 khz the sampling rate for each channel signal is 8 khz. The resulting sample is then quantized into for example, 128 or 256 levels and each level is assigned to a discrete code of seven or eight binary digits termed bits. In typical prior art systems, a common path accommodates 24 channels. In the case of voice communications, the common path accommodates 24 simultaneous conversations. With a sampling rate of 8 khz, each time slot has a duration of 5.2 microseconds and recurs at 125 microsecond intervals. The 125 microsecond intervals are termed "frames". It is assumed that the eight bits of the PCM code are transmitted over the common path in each 5.2 microsecond time slot. The time slot assigned to each channel is recognized at each switching point in accordance with its sequential position in the frame which in turn is identified by a bit appearing at the beginning of each frame interval. In the prior art arrangements, a frame of 125 microseconds comprises eight bits per channel × 24 channels plus one framing bit equals 193 bits per frame and the resultant bit rate corresponds to 193 × 8 khz or 1.544 mHz on a 24 channel transmission path.

Where it is required to provide a channel capacity greater than 24 channels, several 24 channel transmission systems may be combined in a transmission system having a higher bit rate so that a greater number of signals may be transmitted. In such an arrangement, one transmission path may be used to accommodate $n$ 24 channel systems, whereby the bit rate is $n$ times higher than the individual system bit rate. This type of system is an interleaved multiplex PCM transmission system. In the interleaved transmission arrangement, each time slot of 24 time slots is divided into eight bits and each bit is further divided into $n$ minibits. Each minibit interval accommodates one information bit of an individual system PCM code. Thus one time slot is sufficient to transmit $n$ PCM codes. Such an interleaved PCM transmission arrangement is described in Inose et al., application Ser. No. 849,634, filed Aug. 13, 1969.

In a time division switching arrangement utilizing the aforementioned interleaved transmission scheme, it is necessary to identify which stations have been assigned to which time slots in the recurring cycle so that signals may be sampled at the proper time. Where geographically remote groups of stations are included in the switching system, a blocking problem is introduced if the same time slot is not available in the switching arrangements between two stations. This problem is enhanced as the number of switching stages through which the connection must be established is increased. Thus, where a plurality of switching stages is required, the chances of any one minibit channel of a time slot being simultaneously idle throughout the network is reduced and the possibility that complete blocking and loss of the connection will occur is increased.

The prior art arrangements such as in Inose et al., application Ser. No. 849,634 filed, Aug. 13, 1069, include time channel interchanging which permits the selection of available minibit channels at each stage of the switching system so that the blocking is avoided. In the interleaved PCM transmission arrangements, blocking may be avoided by shifting the positions of the minibits in each time slot so that free minibit channels of the $n$ system arrangement in each time slot may be utilized to complete the connection. The shifting of minibits is accomplished in delay devices termed pulse shifters which are used in each time division path to appropriately delay the minibits associated with a connection so that the connection may be completed through available minibit channels. Where a plurality of time division paths utilizing the interleaved PCM transmission arrangements are involved in a communication system, it is necessary to provide control memory arrangements to appropriately direct the transmission of the PCM codes in interleaved form through the switching system from the originating station to the destination station. If is readily observed that control memory arrangements are required in each time division path and in the switching networks interconnecting time division paths of the system and that the capacity of such memory arrangements must be sufficient to control the large number of pcm coded signals being transmitted.

BRIEF DESCRIPTION OF THE INVENTION

Our invention is a control memory arrangement in a time division multiplex communication system having a plurality of groups of time division paths and wherein a plurality of time slots occur in repetitive cycles. Each time slot is divided into a plurality of information bit intervals to accommodate a plurality of interleaved codes. A gating network selectively interconnects one group of time division paths with another group of time division paths in each information bit interval of a time slot to selectively transfer information bits from the one group time division paths to the other group time division paths. a control circuit operates to selectively enable the gates of the gating network in each information bit interval and a control memory is provided for each path of the group having the lesser number of paths. Control codes are stored in the memory which codes determine the operation of the gates associated with the memory. Each control memory has a capacity corresponding to a multiple of the number of paths in the group having the greater number of paths.

According to one aspect of the invention a plurality of n interleaved PCM codes are transmitted in each of $m$ time slot which is divided into a plurality of bit intervals and subdivided into $n$ channels. The control memory associated with the gates stores a code which repetitively connects a first group time division bus to a second group time division bus in selected channels in time slot so that a selected PCM code is transferred from one group time division path to a predetermined other group time division path in each time slot.

According to another aspect of the invention, each control memory has a capacity corresponding to $m\ n$ $\log_2$ of the number of time division paths in the group having thee larger number of time division paths whereby the control memory size is minimized.

According to another aspect of the invention, each time division path includes apparatus for interchanging the positions of the bits of a plurality of interleaved PCM codes in each time slot. The time slot interchange apparatus is operative to interchange the sequence of $n$ interleaved PCM codes in a time slot and a control memory associated with the interchange apparatus stores codes each having $\log_2 n$ bits to specify the time division channel of the output for each time division channel of the input.

In an embodiment illustrative of our invention, a group of $j$ incoming time division buses are interconnected to a group of $k$ intermediate time division buses via a first crosspoint gate network and the $k$ intermediate time division buses are interconnected to a group of $l$ outgoing time division buses via a second crosspoint gating network $j \leq l$ and $k \leq l$. Each incoming and outgoing time division bus includes a pulse shifter for interchanging the order of interleaved PCM codes transmitted on said buses in each time slot. One crosspoint gate control network is provided for the network interconnecting the $j$ incoming buses with the $k$ intermediate buses and another crosspoint gate control network is provided for the network interconnecting the $k$ intermediate buses with the $l$ outgoing buses. The one crosspoint gate control includes a crosspoint gate memory for each of the $j$ incoming buses with a capacity corresponding to $\log_2 k$ for each bit to be transferred. The other crosspoint gate control includes a memory for each of the $l$ time division buses with a capacity corresponding to $\log_2 k$ for each bit to be transferred. In this way, the capacity of each control memory is minimized.

In another embodiment illustrative of our invention, a group of $j$ incoming time division buses are interconnected to a group of $k$ intermediate buses via a first crosspoint network and the $k$ intermediate buses are interconnected to a group of $j$ outgoing time division buses via a second crosspoint network, $j \leq k$. Each incoming, intermediate and outgoing time division bus includes a pulse shifter for interchanging the order of the channels of each time slot. A single crosspoint control circuit is provided for the crosspoints of one incoming time division bus in the first crosspoint network and the crosspoints of a corresponding outgoing time division bus in the second crosspoint network. The crosspoint control circuit includes a crosspoint memory having a capacity corresponding to $\log_2 k$ for each channel bit to be transferred. In this way, the total capacity of the memories in the crosspoint control circuits is reduced to $j \log_2 k$ for each bit to be transferred.

DETAILED DESCRIPTION

Figure 1:
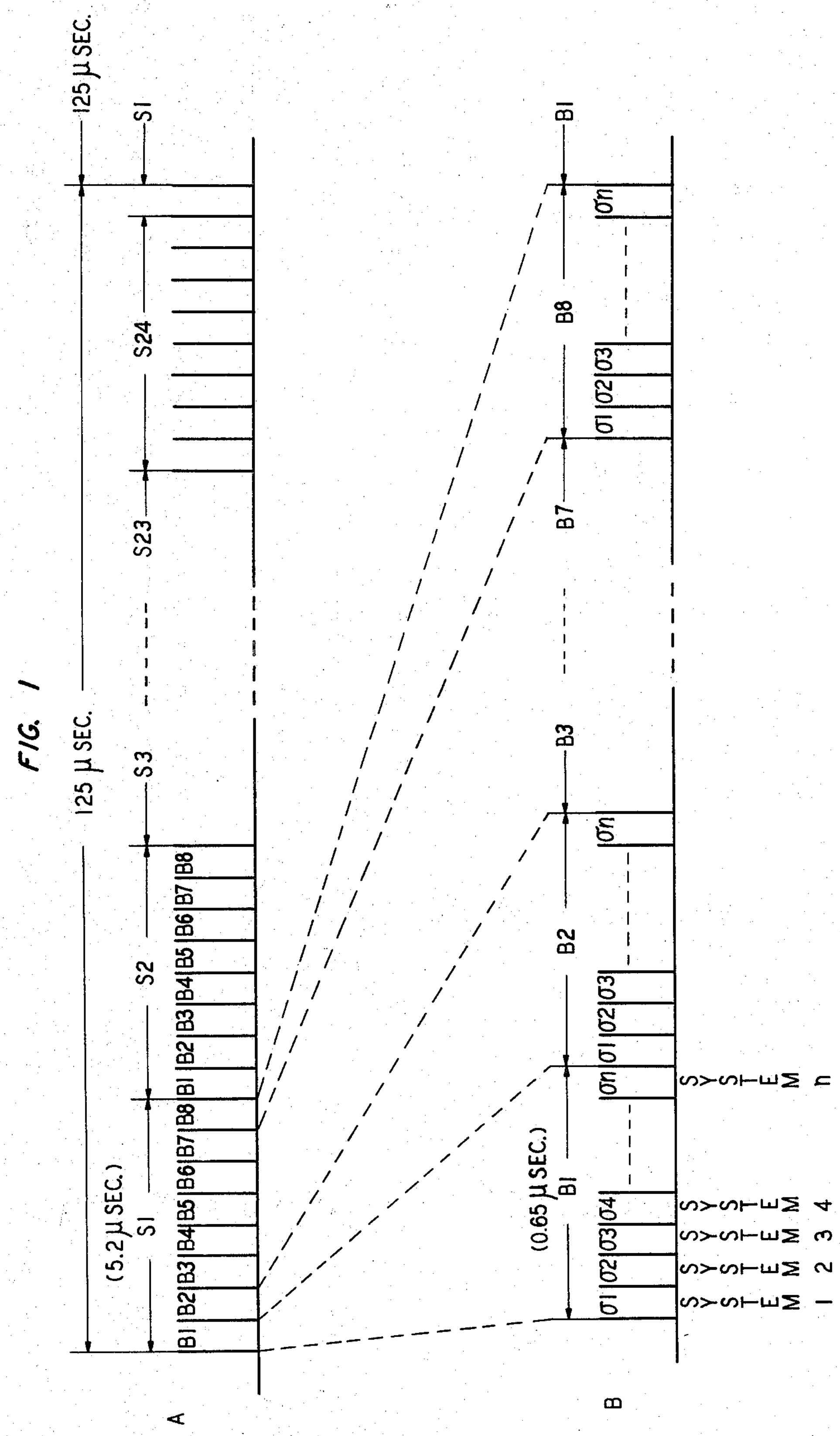
FIG. 1 shows a time chart illustrating the time slot arrangements of prior art PCM transmission systems and a time chart illustrating the time slot arrangements of the interleaved PCM transmission system used in our invention.

Line A of FIG. 1 is a time chart illustrating the time slot arrangements on a time division bus wherein 24 PCM codes are multiplexed onto the bus in each frame. The frame interval of 125 microseconds is divided into 24 time slots s1 – S24 and each time slot is further divided into eight bit intervals B1 – B8 each of approximately 0.65 microseconds duration. A signal is assigned to a particular one of the 24 time slots S1 – S24 and each time slot is divided into eight bit intervals B1 – B8. The first eight bits of each frame are included in the first time slot S1. Each succeeding time slot also comprises eight bits. The last bit interval in each frame B193 which occurs between time slots S24 of the frame and S1 of the next frame carries synchronizing information for the particular frame in which it appears. The first seven bits in each time slot B1 – B7 are assigned to a signal in coded form while the final bit B8 may be used to transmit the status of the signal source. In this way, 24 signals in coded form are multiplexed onto each frame so that the transmission rate of each code is sufficient to adequately define the signal.

Line B of FIG. 1 shows a time chart which illustrates the time slot assignments of an interleaved PCM transmission system. As noted in line B of FIG. 1, the codes of $n\times 24$ channel PCM systems are multiplexed onto a single frame on a time division bus. The duration of bit interval B1 in time slot S1 is further divided into $n$ minibit intervals $\sigma 1, \sigma 2, \ldots \sigma n$. Each of these minibit intervals $\sigma 1$–$\sigma n$ in bit B1 of time slot S1 conveys a first bit of one of the $n$ PCM codes transmitted in time slot S1. Similarly, each minibit of $\sigma 1$–$\sigma n$ in bit B2 of time slot S1 conveys the second bit of one of the $n$ PCM codes of the interleaved systems in time slot S1. Thus there is a phase difference of $1/n$ of a bit interval for each PCM code bit and the bits of an individual PCM code of the time slot are assigned to 8 designated minibit intervals of time slot S1 such as S1B1σ1, S1B1σ1, . . . S1B1σ1. In this way 24 × $n$ PCM codes are interleaved onto each frame.

Figure 2:
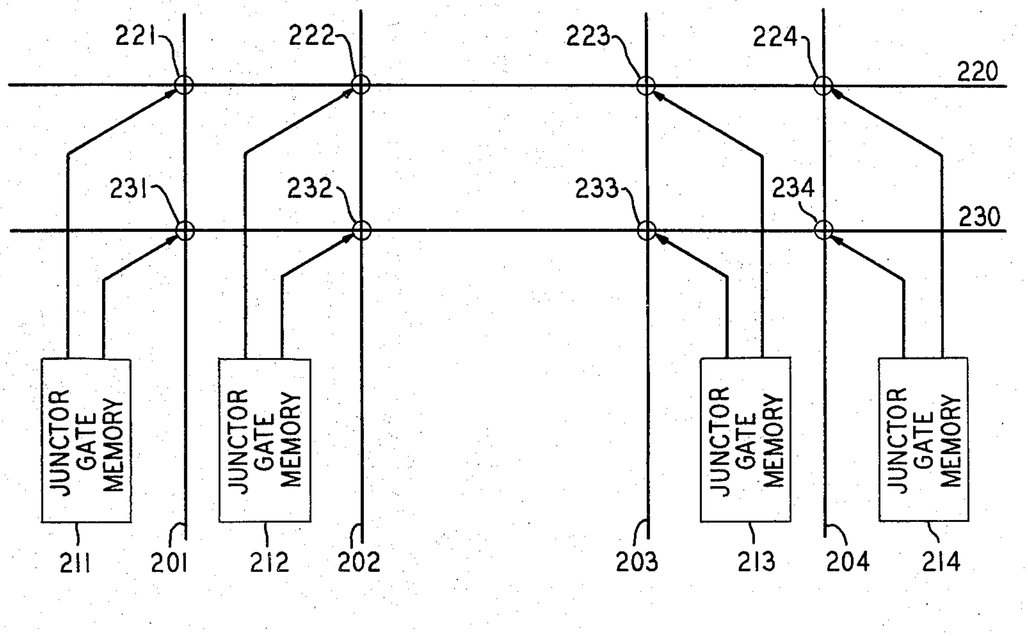
FIG. 2 depicts a block diagram of a time division multiplex communication system utilizing the interleaved PCM transmission arrangements.

FIG. 2 shows a time division multiplex switching arrangement wherein incoming interleaved PCM codes are received on incoming time division buses 201 and 202 and are switched onto outgoing time division buses 203 and 204 via intermediate time division buses 220 and 230. Switching between the incoming and outgoing time division buses via the intermediate buses is accomplished through gates 221–224 and 231–234. Junctor gate memories 211–214 control the crosspoint gates which interconnect the incoming and outgoing time division buses via the intermediate time division buses. Although only two incoming buses, two outgoing buses, and two intermediate buses are shown in FIG. 2, it is to be understood that a greater number of buses may be used in each group and further that the number of intermediate buses is larger than the number of incoming or outgoing buses so that the association of the junctor gate memories with the incoming and outgoing buses is in accordance with our invention.

A typical connection will illustrate the operation of the time division system of FIG. 2. Assume that a connection is made between incoming bus 201 and outgoing bus 203 in a given minibit position such as S1 Bj σ*k*. To transfer a pulse in this bit position from bus 201 to bus 203 through intermediate bus 220, gates 221 and 223 are opened at S1 B*j* σ*k*. Junctor gate memories 211 and 213 operate during this time period to enable gates 221 and 223. It is to be understood that, when the code bit in S1 Bj σ*k* is transmitted through the aforementioned route, other code bits of the same system in the same time slot are also routed through the same path. Thus, the code bits in minibit bit positions S1 B*x* σ*k* where $x = 1, 2 \ldots 8$ are routed through the same path so that the PCM code of the given system is transferred via this path from incoming bus 201 to outgoing bus 203. In other minibit time periods, the buses and gates of the system of FIG. 2 are used to carry other PCM coded signals and the junctor gate memories operate appropriately to control the junctor gates which gates effect the desired transfers.

The minibit period S1 B*j* σ*k* in which the incoming PCM coded signal arrives may be already occupied in intermediate bus 220 or in outgoing bus 203. Where intermediate bus 220 is not available during this minibit period, another intermediate bus such as 230 may be used. If, however, the minibit S1 B*j* σ*k* is not available on any intermediate bus or on any outgoing bus, the connection cannot be completed although another minibit period may be idle. In this event, the connection cannot be established because the idle minibits that are available are not in proper phase. This results in internal blocking or time slot mismatch.

In the arrangement of FIG. 2, the probability of blocking may be sufficiently large that the efficiency of the network is substantially degraded. As is well known in the art, the blocking problem can be solved through the use of time slot interchange by means of phase shifting devices called pulse shifters. The pulse shifter operates to shift the minibit position on the incoming time division bus to another arbitrarily designated position wherein the connection to the other buses can be completed.

The memory capacity of a pulse shifter may be very large where it is necessary to shift all the bit positions in a system to avoid blocking. This requires a pulse shifter with a capacity of 192 bits. In the interleaved PCM arrangement, the pulse shifter must have a capacity corresponding to 192 times $n$ bits to provide full shifting capability. In practice, however, such a large memory capacity is not required and a memory capacity corresponding to the number of bits in a PCM code may suffice. In the interleaved PCM arrangements illustrated in FIG. 1B, the minibits of each system are interleaved in a predetermined order in each time slot. Thus, it is possible to provide time slot interchange by shifting all the minibits of one system in a time slot by one bit position. In this way, the incoming minibit position is shifted to a different succeeding minibit position and blocking may be avoided.

Figure 3:
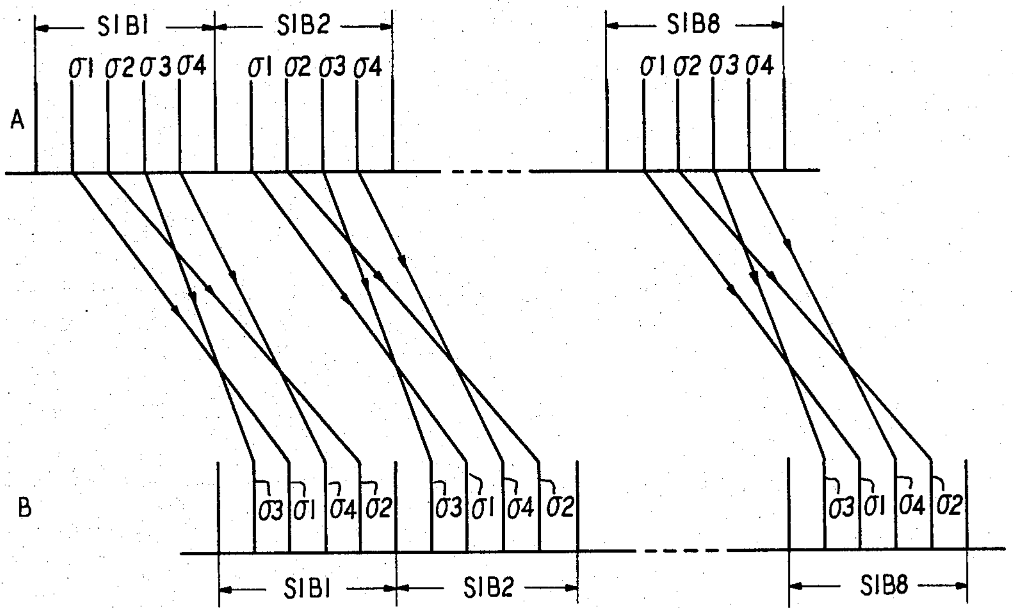
FIG. 3 shows time charts which illustrate the time slot interchange principles used in the block diagram of FIG. 2.

FIG. 3 illustrates an interleaving arrangement wherein four systems are transmitted in each time slot bit position. In FIG. 3A the minibits in bit positions B1 – B8 in time slot S1 are shown. The order of the minibit positions is σ1, σ2, σ3, σ4. FIG. 3B shows the arrangement of the minibit positions after interchange. The output of FIG. 3B is delayed from the input on FIG. 3A by one bit position and the order of the bits is changed from σ1, σ2, σ3, σ4 on FIG. 3A to the sequence σ3, σ1, σ4, σ2 in the next succeeding bit position in FIG. 3B. In FIGS. 3A and 3B, the sequence of minibits is maintained throughout the eight bit positions in each time slot. Thus, the sequence σ1, σ2, σ3, σ4 occurs in each bit position S1B1 – S1B8 of the time slot shown in FIG. 3A and the sequence σ3, σ1, σ4, σ2 2 is the same in each bit position S1B1 – S1B1 shown in FIG. 3B. The time slot interchange is repeated for each bit in the time slot so that the shifting of the minibits of each PCM code in the time slot is identical.

Figure 4A:
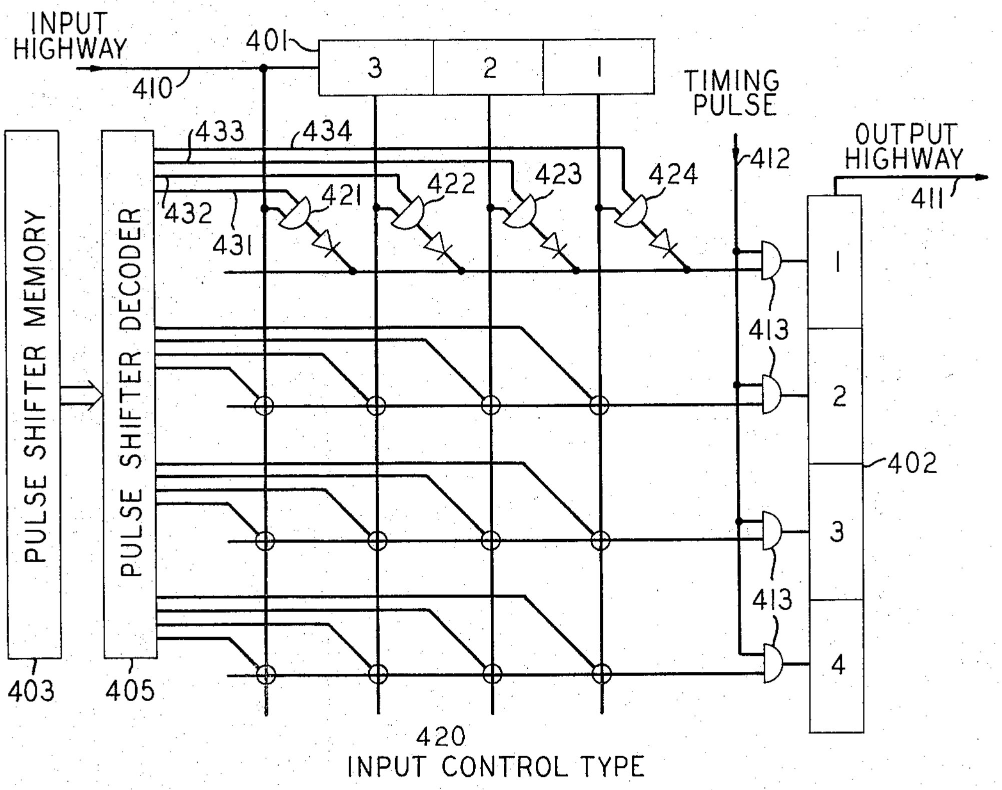
FIG. 4A depicts a block diagram of an input control pulse shifter useful in our invention.

A pulse shifter of the input control type is shown in FIG. 4A. This pulse shifter is used to interchange the order of the minibits incoming from incoming lead 410 so that it may be sent out on outgoing lead 411 in an altered sequence. The order of the interchanging is controlled by pulse shifter memory 403 which stores a code corresponding to the desired interchange for the duration of each time slot. The output of memory 403 is applied to decoder 405 once in each time slot and the decoded signals from decoder 405 are applied to gate network 420 for the duration of the time slot. In gate network 420 only 4 AND gates 421–424 are completely shown. All other gates of the network are symbolically shown by circles. It is to be understood that the gates indicated by circles operate in the same manner as gates 421–424.

Three stage shift register 401 receives the incoming minibits from incoming lead 410 during each bit. The output of each stage of register 401 is connected to a group of AND gates of network 420 and the AND gates are in turn connected to gates 413. For example, the output of stage 1 is connected to gate 424 and the gates in the same column of network 420. Gates 413 operate in the last minibit position of each bit to selectively transfer the contents of register 401 in that position into output register 402. Output register 402 receives signals from network 420 and transfers the received information to outgoing lead 411 in serial form.

Assume for purposes of description that the pulse shifter of FIG. 4A operates to interchange minibit positions in accordance with the time charts on FIGS. 3A and 3B The signals from incoming lead 410 are stored sequentially in register 401 in every bit interval. Thus in the last minibit position of bit S1B1 the information in minibit $\sigma$1 is stored in stage 1 of register 401, the $\sigma$2 minibit is stored in stage 2, and the $\sigma$3 minibit is stored in stage 3. The $\sigma$4 minibit information is available at the input to register 401 at this time. The $\sigma$3 minibit now stored in stage 3 is to be inserted into the first minibit position on outgoing lead 411. To accomplish this transfer, decoder 405 output lead 432 is enabled so that AND gate 422 is activated. Similarly, other outputs of decoder 405 are selectively applied to the remaining gates of network 420 so that each output from register 401 in the output of bus 410 is applied selectively to gates 413 whereby the bits from register 401 and lead 401 may be stored in register 402 in an altered sequence. During the time interval corresponding to the last minibit of bit S1B1, a timing pulse is applied to lead 412 whereby gates 413 are activated and the outputs of the selected gates of network 420 are transferred to register 402. The transferred interchanged bits are then shifted out of register 402 in serial fashion in the sequence illustrated in FIG. 3B. The same interchange occurs during S1B2 through S1B8 so that the output of decoder 405 remains the same throughout the S1 time slot. In this way, only one code need be stored in memory 403 for the entire time slot. This code includes only two bits for the interchange of each minibit of each bit position in the time slot. In general where the interleaved PCM arrangements utilize $2^m$ systems, one code of *m* bits is required for each minibit.

Figure 4B:
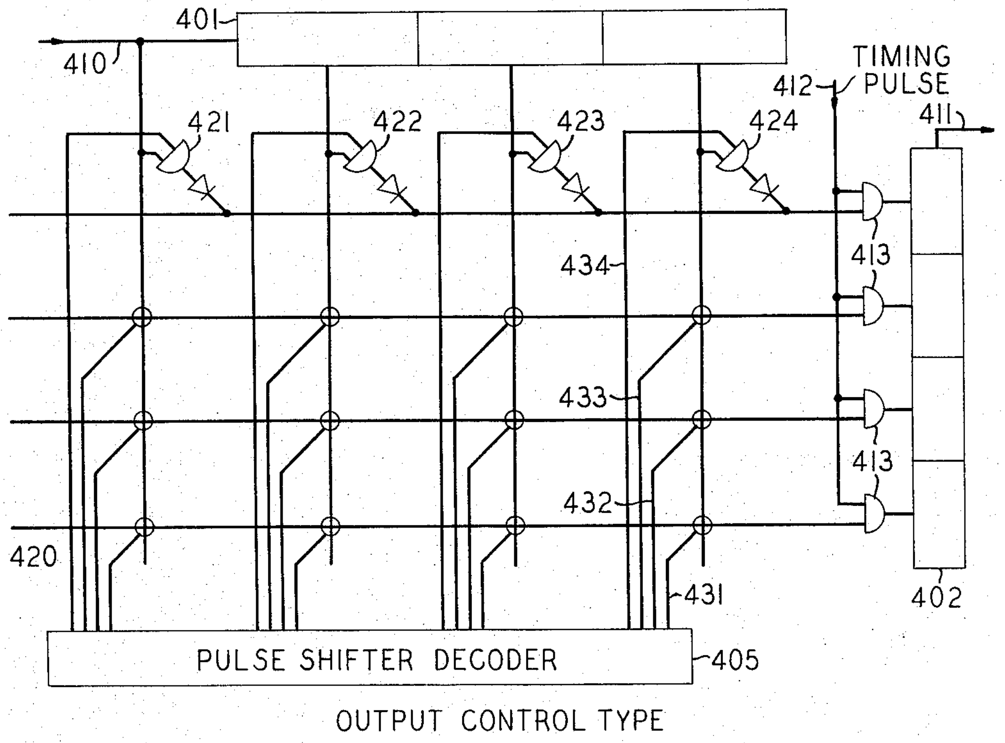
FIG. 4B depicts an output control type pulse shifter useful in our invention.
Figure 5:
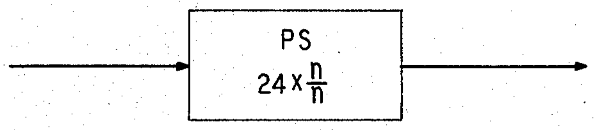
FIG. 5 illustrates the symbol used for the pulse shifter arrangements of FIGS. 4A and 4B.

The arrangements of the output control type pulse shifter of FIG. 4B are substantially similar to those of FIG. 4A except that the connections between the output of decoder 405 and gate network 420 differ. In FIG. 4B an output of decoder 405 is provided for each output of register 401 while in FIG. 4A a decoder output is provided for each input to register 402. since the pulse shifter of FIG. 4A transfers a selected output bit from register 401 to a preassigned input of register 402, it is called an input control type pulse shifter. The pulse shifter of FIG. 4B assigns an input to register 402 for each preassigned output of register 401. It is, therefore, called an output control type pulse shifter. Consider the result when a common decoder is used for both the circuits of FIGS. 4A and 4B. If output lead 433 of the common decoder is enabled the $\sigma$2 bit from the second stage of register 401 in FIG. 4A. is transferred to the $\sigma$1 bit of register 402. In the circuit of FIG. 4B, the enabling of the 433 decoder output lead transfers the $\sigma$1 bit of register 401 to the $\sigma$2 bit of register 402. In general, if the interchange from the $\sigma i$ to the $\sigma j$ bit is performed in one type pulse shifter, the interchange from the $\sigma j$ bit to the $\sigma i$ bit is performed in the other type pulse shifter. Since the pulse shifter operates to arbitrarily interchange bits among groups of *n* bits, it is said to have an availability of 24 × *n* in the interleaved PCM arrangement. The pulse shifter is symbolically denoted as "24 *n/n* pulse shifter". FIG. 5 shows the symbol for pulse shifter as it is used in subsequent figures.

Figure 6:
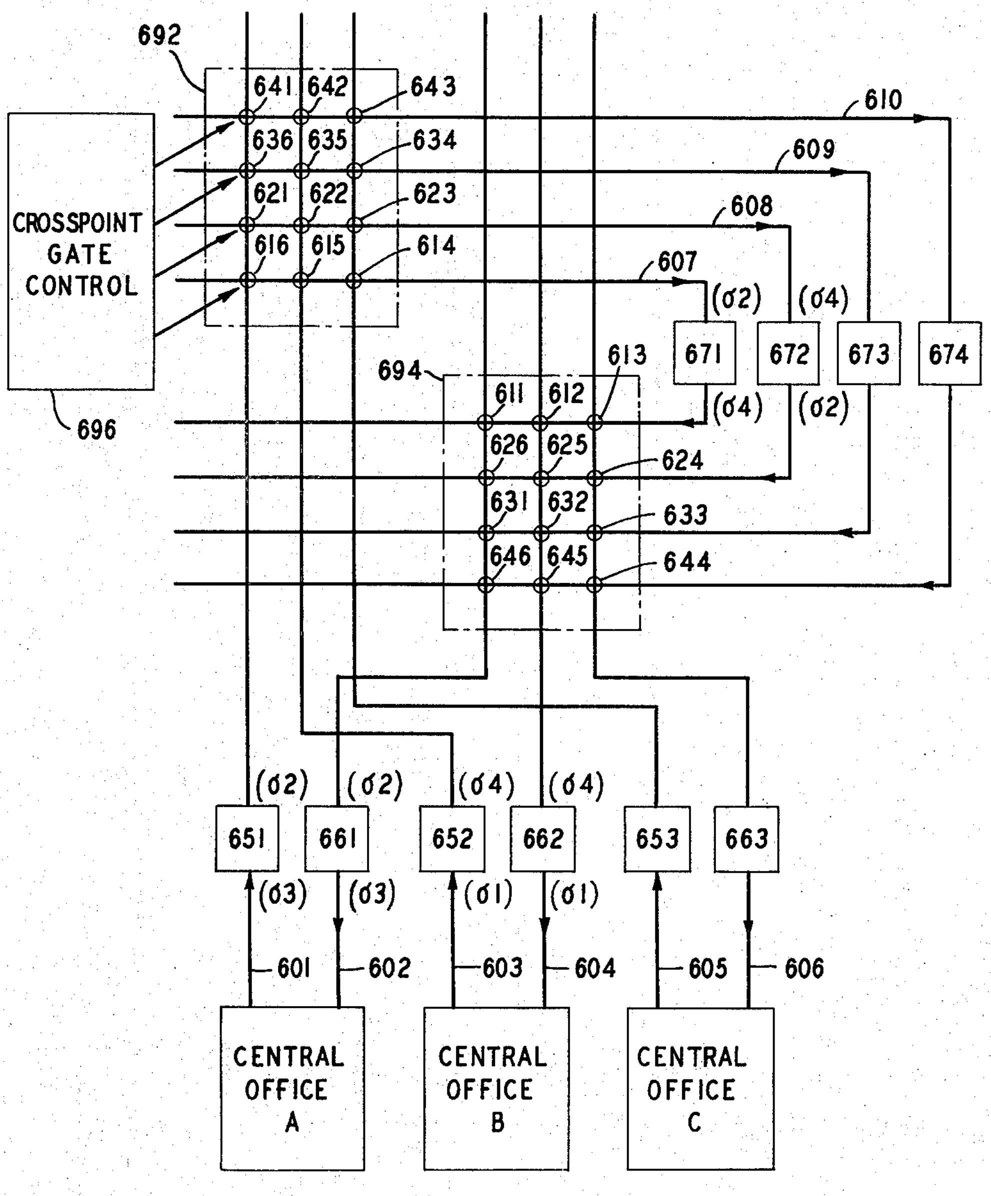
FIG. 6 depicts a block diagram of a time division switching system in accordance with our invention.

FIG. 6 shows a time division switching network utilizing the aforementioned type pulse shifter. In FIG. 6 each of incoming buses 601, 603 and 605, outgoing buses 602, 604 and 606 and intermediate buses 607–610 carry PCM transmissions in which 24 × *n* minibits are interleaved in each frame. Pairs of incoming and outgoing buses 601 and 602, 603 and 604, and 605 and 606 are pairs of four-wire transmission lines operative to connect the switching network of FIG. 6 with central offices A, B and C, respectively. For each central office only one pair of buses is shown. It is to be understood, however, that a larger number of buses may be used to accommodate the traffic.

In FIG. 6 each bus is provided with a 24 *n/n* pulse shifter. Thus pulse shifters 651, 652 and 653 are inserted in incoming buses 601, 603 and 605. Pulse shifters 661, 662 and 663 are inserted in buses 602, 604 and 606 and intermediate buses 607–610 are provided with pulse shifters 671–674 respectively. Although it is not shown, a phase synchronizing circuit well known in the art is associated with the incoming buses to adjust the delay time of the interoffice transmission lines in accordance with well known principles.

Crosspoint network 692 interconnects the incoming buses 601, 603 and 605 with the intermediate buses 607–610. Crosspoint network 694 interconnects intermediate buses 607–610 with outgoing buses 602, 604 and 606. Network 692 operates to selectively transfer code bits in each minibit interval from the incoming buses to the intermediate buses. Similarly the gates of network 694 operate to selectively transfer bits in each minibit interval from the intermediate buses to the outgoing buses. In accordance with the invention, a crosspoint gate memory is associated with each incoming bus to control the gates connected thereto and a crosspoint gate memory is associated with each outgoing bus to control the operation of the gates connected thereto. Crosspoint gate control 696 is used to control the first column of gates in network 692. Similar controls not shown are used to control the remaining columns of gates in network 692 and the columns of gates in network 694.

In the event that a single minibit position in a time slot, e.g., S1$\sigma$1 is available to transfer code information of a PCM code from one incoming bus to another outgoing but via an intermediate bus, there is no time slot interchange in any of the pulse shifters along the selected path, and the crosspoint gates in the path are opened in S1$\sigma$1 to provide the desired transfer. Where there is no single minibit position available throughout the network in a time slot, the pulse shifters along the paths interchange the minibit position so that blocking is avoided. Consider the transfer of a PCM code in a time slot Si from incoming bus 601 to outgoing bus 604 and from incoming bus 603 to outgoing bus 602. Assume that minibit position Si$\sigma$3 is available on buses 601 and 602 to central office A and that minibit position Si$\sigma$1 is available at buses 603 and 604 at central office B. In this event, transposition of the interleaved PCM code information is required in the network of FIG. 6. Assume further that the path from central office A to central office B through the network of FIG. 6 includes bus 601, gate 616, bus 607, gate 612 and bus 604 and that minibit position Si$\sigma$2 is available at the output of pulse shifter 651 while minibit position Si$\sigma$4 is available at the output of pulse shifter 671. In this event, pulse shifter 651 delays the PCM code bit in position SiB*j* σ3 to minibit SiB*j*+1 σ2 so that the desired minibit position information is transferred to bus 607. Pulse shifter 671 operates to shift the desired minibit information in position SiB*j*+1σ2 to position SiBj+102 to position SiBj+204 and the shifted information is transferred via gate 612 to pulse shifter 662 wherein it is again shifted to minibit position SiBj+301.

In the reverse direction, the PCM code bit in position SiB*j*σ1 of the time slot is shifted to position SiB*j*+1σ4 in pulse shifter 652. Crosspoint gate 622 is opened during SiB*j*+1σ4 bit to transfer the code information to pulse shifter 672 in bus 608. Pulse shifter 672 operates to shift the information in SiB*position sibj*+2σ2 and the information is transferred via gate 626 to pulse shifter 661 wherein the information now in minibit position SiBj+202 is shifted to minibit position SiBj+303 this way, the transmission in the reverse direction from central office B to central office A is accomplished without blocking. Advantageously, the interleaved PCM transmission scheme provides an availability of four channels in the network of FIG. 6 so that the probability of blocking is reduced to an acceptable level. In general, an availability of *n* can be provided in the interleaved PCM transmission arrangements whereby the probability of blocking may be reduced as required.

In accordance with our invention, the crosspoint gate memories for controlling the operation of the crosspoint gates of network 692 are associated with the incoming buses rather than the intermediate buses. This is done to minimize the bit requirements of the memories. In order to select one intermediate bus for the transmission from incoming bus 601, $\log_2 4$ bits are required and the operation of crosspoint gate network 692 requires three such memories. If the crosspoint gate memories were associated with intermediate buses 607–610, four such memories would be required and each of the memories would require two bits to select one out of three gates. Thus, the arrangement wherein a crosspoint gate memory is associated with each bus of the group having the lesser number of buses at a crosspoint network operates to minimize the memory size. In like manner, the crosspoint gate memories associated with network 694 are provided for each bus 602, 604 and 606 to minimize the memory size.

Figure 7:
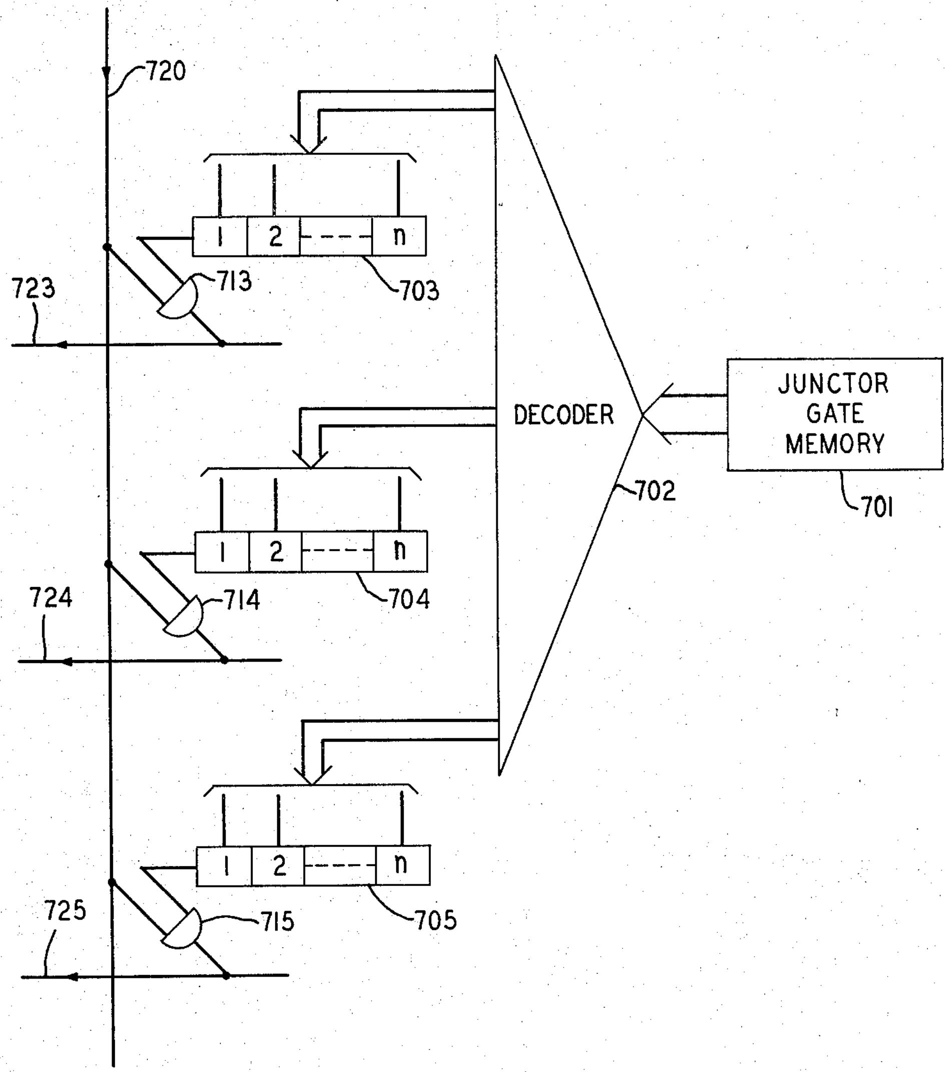
FIG. 7 depicts a crosspoint gate control circuit useful in the switching arrangements shown in FIG. 6.

FIG. 7 shows a crosspoint gate control arrangement useful in the embodiment shown in FIG. 6. In this arrangement, information from bus 720 is transferred selectively to buses 723, 724 and 725 through gates 713, 714 and 715, respectively under control of the information stored in junctor gate memory 701. The circuit of FIG. 7 may be incorporated in the time division systems of FIGS. 2 and 6. In FIG. 2, the memory and control arrangement of FIG. 7 may be used in junctor gate memories 211 through 214 and in FIG. 6, the junctor gate memory arrangement of FIG. 7 may be used to control gating networks 692 and 694.

Referring to FIG. 7, memory 701 stores control codes that are used to provide signals that selectively enable gates 713–715. Just prior to the beginning of a time slot, the codes associated with the time slot are read out of memory 701 and are decoded in decoder 702. Decoder 702 provides *n* outputs for each of recirculating shift registers 703, 704 and 705. Each of these shift registers has *n* stages. Each shift register stage corresponds to a minibit position. Thus, shift register 703 has *n* stages to control gate 713 during the *n* minibits of each bit position. Since the sequence of gate control pulses is repeated for each bit position, the information stored in the shift register is recirculated for the number of times corresponding to the number of bits in each time slot. A 1 is inserted in each shift register position where a gate is enabled to transfer a PCM code bit from line 720 to the line of line 723, 724 and 725 connected to the shift register associated gate. Thus, if stage 1 of shift register 703 contains a 1, gate 713 is enabled during the first minibit position of each bit of the time slot to transfer the PCM code bit in that time interval from line 720 to line 723. In this manner, the PCM code assigned to the first minibit position is transferred from line 720 to line 723. Where a 1 is contained in stage 2 of shift register 704, the PCM code on line 720 during the corresponding minibit position is transferred from line 720 to line 724. In this way, the interleaved PCM transmission on a time division bus such as bus 720 may be appropriately transferred to selected buses of another group of time division buses in accordance with the invention. It should be noted that it is only necessary to store one selection code in memory 701 for each time slot to control the transfer of *n* PCM codes from one time division bus to a group of outgoing time division buses via a crosspoint gate network.

Figure 8:
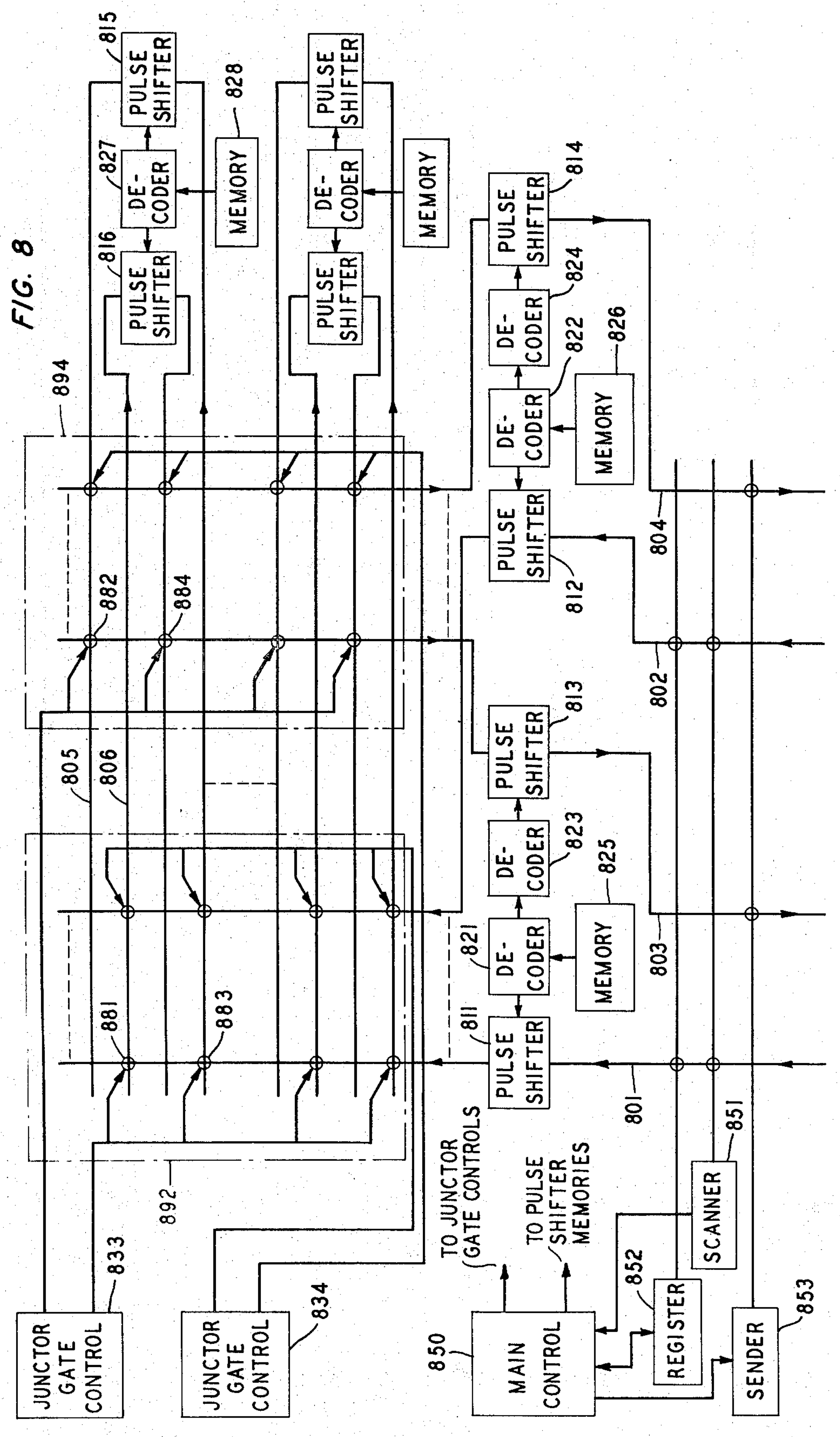
FIG. 8 depicts a block diagram of a time division switching system in accordance with our invention.

FIG. 8 shows a block diagram of a time division switching system for interleaved PCM transmission. Many of the components of the system such as junctor scanner 851, register 852, sender 853 and main control 850 shown in FIG. 8 are well-known in the art and are not described in detail. The switching system of FIG. 8 operates to connect each minibit in an interleaved PCM transmission arrangement from input time division junctors 801 and 802 to output time division junctors 803 and 804. Only two input junctors and two output junctors are shown in detail. It is to be understood, however, that a larger number of input and output junctors may be used in accordance with the invention as indicated in FIG. 8.

PCM code bits arriving in preassigned minibit positions from an input junctor such as 801 are routed through pulse shifter 811, one of the transit junctors 805 and 806, and are transmitted to other offices through one of junctors 803 and 804. Transit junctor 805 is provided with pulse shifter 815. Transit junctor 806 is provided with pulse shifter 816. Output junctor 803 is provided with pulse shifter 813 and output junctor 804 is provided with pulse shifter 814. Pulse shifters 811 through 816 may be of the types shown in FIGS. 4A and 4B and these pulse shifters are controlled by pulse shifter memories 821 through 824 and 827. At the crosspoints between the input junctors and the transit junctors and the output junctors, junctor gating networks are provided which are controlled by junctor gate controls 833 and 834. The junctor gate controls each comprises a junctor gate memory, recirculating shift registers, and a decoder arranged in accordance with the circuit of FIG. 7.

When a call is originated, scanner 851 connected to each of the input junctor detects the start of the call by monitoring the signals on each minibit channel of the input junctors. When the call origination is detected, a signal is sent from scanner 851 to main control 850 which, in response thereto, enables register 852 and also assigns the call to the minibit channel in which it was detected. A signal is then sent from register 852 to control 850 which represents the call destination code and control 850 operates to select a path through the network of FIG. 8 whereby the input junctor minibit channel is connected to an available channel of the destination output junctor. After the path selection is made in control 850, signals are sent from control 850 to the pulse shifter memories 825 through 827 and the junctor gate memories of junctor gate control circuits 833 and 834. As a result of the signal transmission to the memories, information is stored in the memories to appropriately enable the transmission gates of the system in each minibit channel. The destination code is further transmitted via sender 853 and output buses 803 and 804 to the next switching network in the transmission path. The destination code is received by the next switching network which operates in a manner similar to that just described to control switching during the call.

In the system of FIG. 8, the pulse shifters are arranged in pairs, each pair includes an input control type pulse shifter and an output control type pulse shifter. Thus pulse shifter 811 is an input control type pulse shifter while the paired pulse shifter 813 is an output control type pulse shifter. Memory 825 stores codes necessary for the control of pulse shifters 811 and 813. As hereinbefore described, pulse shifter 811 may operate to transpose minibit position $\sigma i$ to minibit position $\sigma j$. In this event, pulse shifter 813 operates to transpose minibit $\sigma j$ to minibit position $\sigma i$ so that a single control code may be used for both pulse shifters. In like manner, paired pulse shifters 812 and 814 are controlled by pulse shifter memory 826 and paired pulse shifters 815 and 816 are controlled by pulse shifter memory 828.

Figure 9:
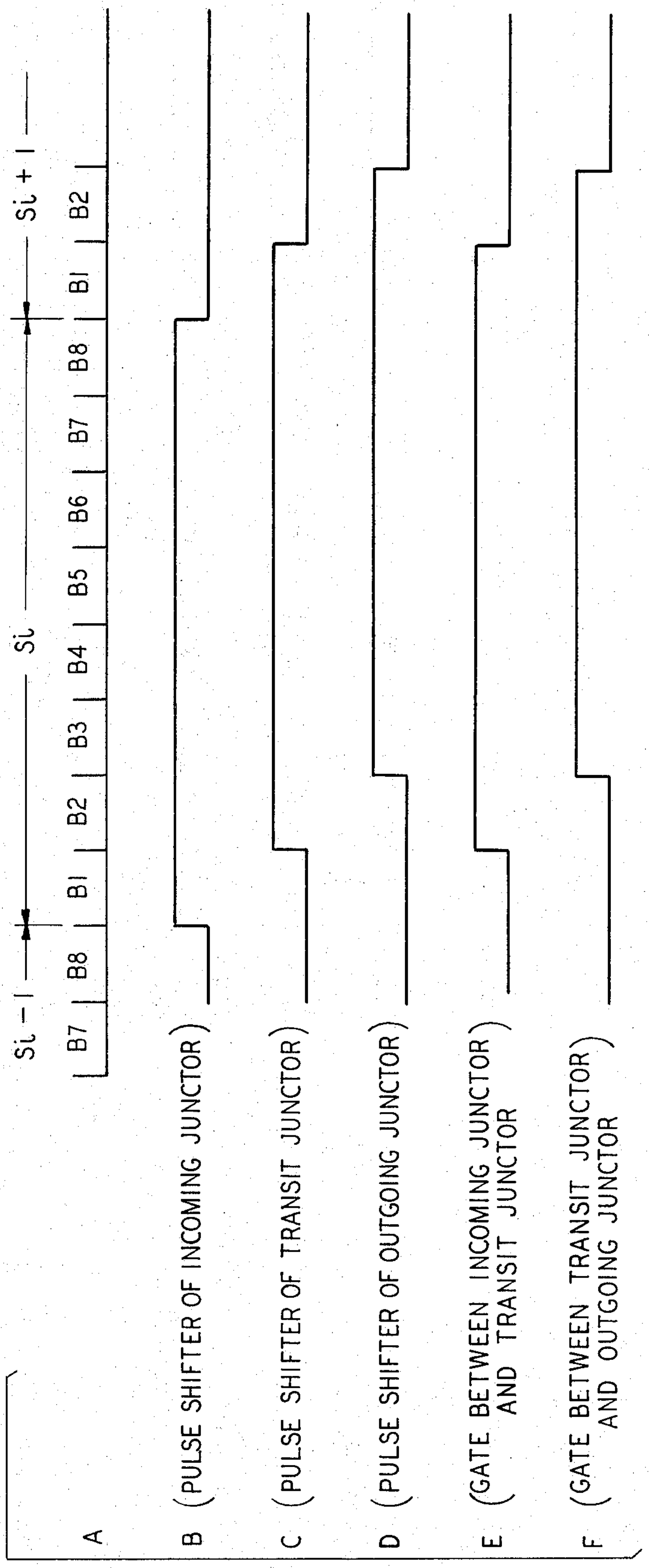
FIG. 9 shows timing arrangements useful in the block diagram of FIG. 8.

FIG. 9 shows a timing chart that illustrates the timing of the control pulses for the switching network of FIG. 8. As described with respect to FIGS. 3 and 4, a delay of one bit position occurs when the PCM coded information passes through a pulse shifter. Therefore, the operation of the pulse shifter controls and the crosspoint gate controls must be timed accordingly.

Chart A of FIG. 9 shows time slot S1 and portions of time slot S1−1 and S1+1 at the input of an input junctor pulse shifter such as 811. The information incoming on input junctor 801 during time slot S1 in pulse shifter 811 is controlled during the time indicated by waveform *b* of FIG. 9. This waveform shows the time during which the output of decoder 821 is active to control minibit time slot transposition. Waveform C of FIG. 9 shows the time during which the outputs of decoder 827 appear to control the operation of pulse shifters 815 and 816. The delay through pulse shifter 811 is one bit time whereby waveform C is delayed from waveform B of FIG. 9 by bit time B1. With reference to Chart A FIG. 9, waveform C shows that decoder 827 is active to control pulse shifters 815 and 816 from S1B2 through S1+1B2 Since the PCM information passes through both pulse shifters 811 and 815 before arriving at pulse shifter 814, waveform D which represents the outputs of decoder 824 and occurs from the beginning of S1B3 to the end of s1+1B2. It should be noted that two decoders are associated with each of memories 825 and 826. This is done to provide the necessary delay in control information for both the incoming control type and output control type pulse shifters associated with the memory.

Waveform E of FIG. 9 illustrates the period during which the gates of junctor gate network 892 are active. Since there is a one bit delay in the incoming junctor pulse shifter, the gate network 892 is active from SiB2 through Si+1B1. In like manner, the gate network 894 between the transit junctors and the outgoing junctors are operative after the information has passed through two cascaded pulse shifters whereby the delay of two bit positions is required before the gating network is enabled. In waveform F of FIG. 9, the timing on these gates is shown from the beginning of SiB3 through Si+1B2.

Junctor gate networks 892 and 894 include junctor gates that operate in pairs. For example, gate 881 operates in a paired relationship with gate 882 and gate 883 operates in a paired relationship with gate 884. This is so because of the paired operations of the input and output junctor pulse shifters. With respect to gates 881 and 872, the paired relationship of pulse shifters 811 and 813 cause gates 881 and 882 to operate in the same minibit position during a time slot although the operation of gate 882 is delayed by one bit position from the operation of gate 881. This paired relationship advantageously permits the use of a single junctor gate control for both gates 881 and 882. As shown in FIG. 8, junctor gate control 833 operates to control all the crosspoint gates in the same column as gates 881 and 883 as well as the junctor crosspoint gates in the same column as 882 and 884. The paired relationship thereby reduces the control circuit and control memory size. In like manner, junctor gate control 834 operates to control one column of crosspoint gates in network 892 and the corresponding column of crosspoint gates in network 894.

Figure 10:
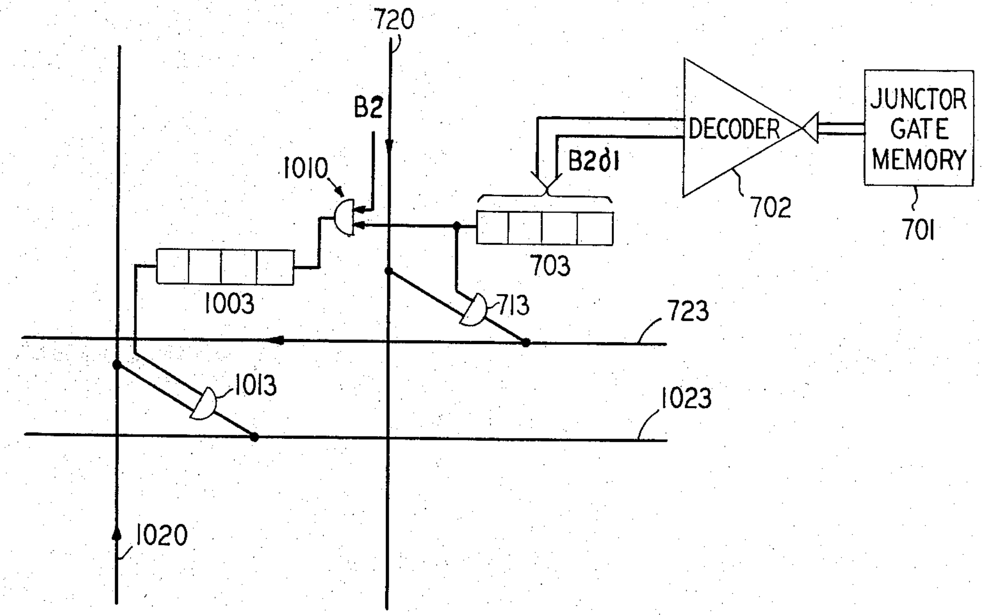
FIG. 10 depicts a block diagram of a control arrangement in accordance with our invention.

FIG. 10 illustrates the junctor gate control technique useful in FIG. 8. Junctor gate memory 701 and decoder 702 are contained in junctor gate control 833. The control information from decoder 702 is applied to crosspoint gates 881 and 882 each of which comprises a gate 713 and a shift register 703 and a gate 1012 and a shift register 1003. Junctor 723 and 1023 of FIG. 10 operate in a paired relationship and junctor 720 and 1020 also operate in a paired relationship, so that gates 713 and 1013 operate in the same manner in the same minibit positions although the operation of gate 1013 is delayed from the operation of gate 713 by one bit position as indicated on charts E and F of FIG. 9.

The control information from decoder 702 is applied to recirculating shift register 703 in parallel in minibit position B2$\sigma$1. In this way, the operation of gate 713 is controlled by the output of decoder 702 from the beginning of bit B2 for one time slot. In this B2 bit interval the control information in recirculating register 1003 corresponds to that of the previous time slot and junctors 1020 and 1023 are connected in accordance with the information previously stored for the former time slot. Gate 1010, connecting shift register 703 to shift register 1003, is enabled during bit position B2 so that the content of shift register 703 is serially transferred to register 1003 during this bit interval. Thus, at the beginning of minibit position B3σ1, the shift of control information from register 703 to register 1003 is completed and both registers operate in a paired relationship to provide identical switching. Gate 1010 is disabled until the B2 position of the next time slot and the same control information is recirculated in both shift registers. Therefore, gate 1013 repeats the same operations as gate 713 for one time slot until Si+1B2. Shift register 703 receives new control information at B2σ1 of the next time slot. Consequently, the paired relationship is maintained with the delay of one bit position.

Figure 11:
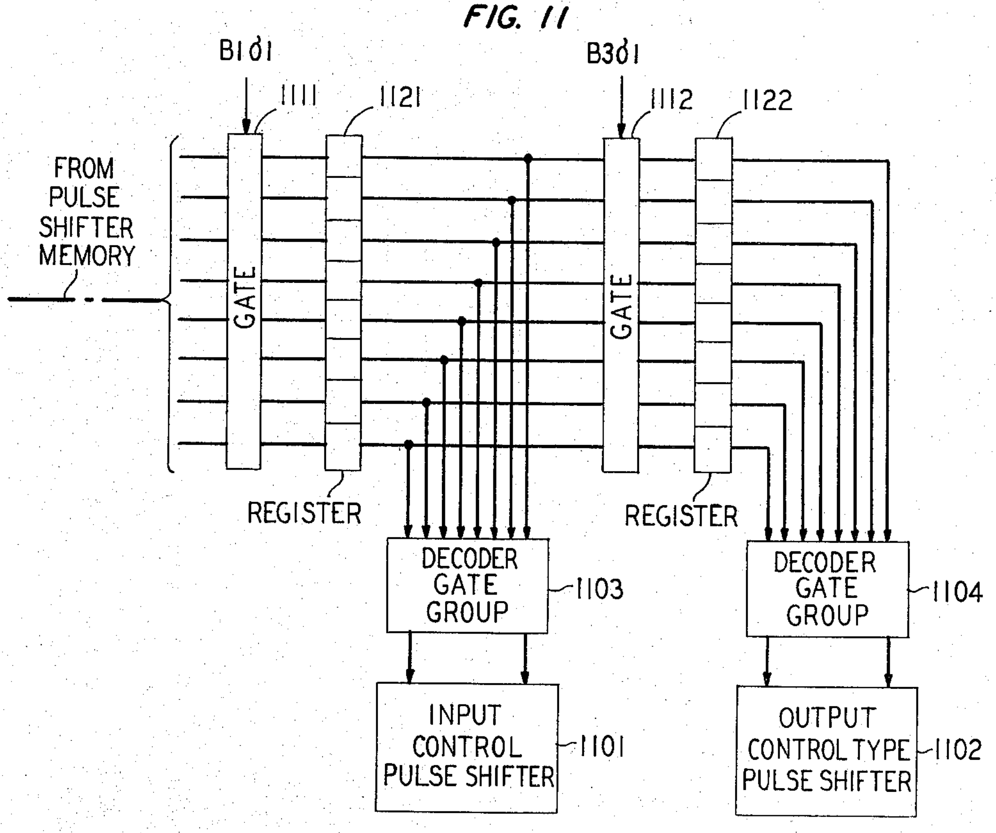
FIG. 11 depicts a block diagram illustrating control arrangements for the pulse shifters of FIGS. 4A and 4B.

FIG. 11 shows a block diagram of a control scheme for paired pulse shifters. Pulse shifter pair 1101 and 1102 may be used as pulse shifter pair 811 and 813 shown in FIG. 8. Pulse shifter 1101 may correspond to pulse shifter 811 in FIG. 8 and pulse shifter 1102 may correspond to pulse shifter 813 in FIG. 8. Decoder 821 may include gates 1111, register 1121 and decoder gate group 1103 while decoder 823 may include gate group 1112, register 1122 and decoder gate group 1104. As indicated in FIG. 11, the control code for a time slot is applied to gate group 1111. This gate group comprises a plurality of parallel gates, each of which controls an input to register 1121. In minibit position B1σ1 of the time slot, the gates of gate group 1111 are opened and the control codes from the pulse shifter memory are transferred to register 1121. The control codes are in turn applied to decoder gate group 1103 and to gate group 1112. Pulse shifter 1101 is an input control type pulse shifter such as the one shown in FIG. 4A. Decoder gate group 1103 corresponds to decoder 405 in FIG. 4A. Therefore, pulse shifter 1101 operates as an input control type pulse shifter to transpose minibits over the range of one bit interval with a delay of one bit.

As aforementioned with respect to FIG. 8, the operation of pulse shifter 813 is delayed from the operation of pulse shifter 811 by two bit positions. This is indicated on Charts B and D of FIG. 9. Consequently, the operation of output control type pulse shifter 1102 must be delayed from that of input control type pulse shifter 1101 by two bit positions. This is done through gate group 1112 and register 1122. The output of register 1121 is applied to the gates of group 1112 prior to minibit position B3σ1. When the gates of the group 1112 are enabled by a control signal occurring in minibit positions B3σ1, the control codes previously stored in register 1121 are transferred to register 1122 and these control codes are decoded in decoder gate group 1104 to control output control type pulse shifter 1102 in the manner described with respect to FIG. 4B. In this way, the paired operation of registers 811 and 813 is accomplished with the necessary delay to account for the passage of information through the pulse shifters of the network of FIG. 8.

The information codes to control pulse shifters 1101 and 1102 stored in registers 1121 and 1122 may be coded in the following manner where there are four minibit positions in each bit interval. Each register must contain two bits for the system corresponding to each minibit position. Thus the first two bits in the register control the first system, the third and fourth bits are for the second system, the fifth and sixth bits are for the third system and the seventh and eighth bits are for the fourth system. In the input control type pulse shifter, the decoder may be arranged so that a code 01 in the two bits corresponding to the $i^{th}$ system at the pulse shifter output will result in the first system at the pulse shifter input being transposed to the $i^{th}$ system at the pulse shifter output. A code of 10 will result in the second system being transposed into the $i^{th}$ system. A code 11 will result in the third system being transposed into the $i^{th}$ system and a code 00 will result in the fourth system being transposed into the $i^{th}$ system. With this code arrangement, the output control type pulse shifter of the pair operates in the following manner. The code 01 transposes the $i^{th}$ system at the pulse shifter input to the first system at the pulse shifter output; the code 10 transposes the $i^{th}$ system to the second system; the code 11 transposes the $i^{th}$ system to the third system; and the code 00 transposes the $i^{th}$ system to the fourth system.

In the pulse shifters shown in FIGS. 4A and 4B, the number of input minibit channels is equal to the number of output minibit channels. Thus if an idle channel exists on the input, an idle channel will always be found on the output, and an idle input channel may be connected to an idle output channel without interference. Where one pulse shifter of a pair of pulse shifters is of the input control type and the other pulse shifter is of the output control type as in FIG. 8, it is readily seen that the switching of a minibit position in one pulse shifter provides for the switching of the minibit position in the paired pulse shifter.

In the case of the junctor gate memories, the number of the input channels and the number of the output channels is generally different. Where the number of time slots is $m$, the number of minibit channels is $n$, the input lines of a group of time division lines is $l$ and the number of the output lines is $k$, the total memory capacity used for switching may be $m\ n\ k\log_2 l$ bits or $m\ n\ l\log_2 k$ bits for every minibit position of every time slot. Junctor gate memories may be provided for each of the $k$ junctors. Each such memory then contains codes to identify the number of the junctor in the $l$ group of junctors to be connected to the junctor of the $k$ group having the memory. Alternatively a junctor gate memory may be provided for each of the $l$ junctors. In this event, the memory stores codes to identify the number of the junctor in the $k$ group of junctors to be connected to the junctor with which the memory is associated. It is apparent that if $l > k$ the capacity of the $m\ N\ k\log_2 l$ arrangement is smaller and that if $k > 1$, the capacity of the $m\ n\ l\log_2 k$ arrangement is smaller. Thus, in accordance with the invention, the association of the junctor gate memories with the group having the lesser number of time division lines advantageously results in the smaller size memories.

What is claimed is:

A a time division switching system wherein a plurality of time slots occur in repetitive frames and each time slot is divided into a plurality of information bit intervals comprising a first group of time division paths, a second group of time division paths, gating means interconnecting each time division path of the first group with the time division paths of the second group, and control means for selectively enabling said gating means to transfer information bits from the time division paths of said first group to the time division paths of the second group in each information bit interval, said control means comprising a control memory for each path of the group having the lesser number of paths for storing control codes to selectively enable the gating means associated with said control memory, said control memory having a capacity corresponding to the number of paths in the group having the greater number of paths for each information bit interval.

2. A time division switching system wherein a plurality of time slots occur in repetitive frames and each time slot is divided into a plurality of information bit intervals according to claim 1 wherein said first group of time division paths contains $k$ paths, said second group of time division paths contains $1 \geq k$ paths and the control memory associated with each $k$ path includes $\log_2 l$ bits for each information bit interval.

3. A time division switching system wherein $m$ time slots occur in repetitive frames, each time slot being divided into a plurality of bit intervals and each bit interval being subdivided into $n$ positions comprising a first group of $k$ time division paths, a second group of $l$ time division paths, $k \leq l$, crosspoint means interconnecting each time division path of the first group with the time division paths of the second group, and control means for selectively enabling said crosspoint means to transfer information bits from the time division paths of said first group to the time division paths of the second group in each position, said control means comprising a control memory for each path of the group having $k$ paths for storing control codes to selectively enable the crosspoint means associated with said control memory, said control memory being adapted to store $m$ control codes, each code having $n \log_2 l$ bits.

A a time division switching system wherein $m$ time slots occur in repetitive frames, such time slot being divided into a plurality of bit intervals and each bit interval being divided into $n$ positions according to claim 3 wherein said crosspoint means comprises a plurality of crosspoints, each crosspoint comprising a crosspoint gate connected from one first group time division path to one second group time division path and a register for controlling said gate in each position, and means connected between said crosspoint memory and said crosspoint register for applying control signals corresponding to said control codes to said register.

5. A time division switching system wherein $m$ time slots occur in repetitive frames, each time slot being divided into a plurality of bit intervals and each bit interval being divided into $n$ positions according to claim 4 wherein said register comprises a recirculating register of $n$ stages each stage being operative to store a bit to control said crosspoint gate in one of said $n$ positions for each time slot, and means for applying the output of said recirculating register to said crosspoint gate in repetitive sequences of $n$ bits during each time slot.

6. A time division switching system wherein $m$ time slots occur in repetitive frames, each time slot being divided into a plurality of bit intervals and each bit interval being divided into $n$ positions, a first group of $k$ input time division paths, a second group of $l$ intermediate time division paths, a third group of $k$ output time division paths, $k \leq l$a first crosspoint gating network connected between said first and second group for selectively transferring information bits from the time division paths of said first group to the time division paths of said second group in each position, a second crosspoint gating network connected between said second group and said third group for selectively transferring information bits from the time division paths of said second group to the time division paths of said third group in each position, a plurality of control circuits each associated with one path of said first group and a corresponding path of said third group for selectively enabling one of the crosspoint gates connecting said one path of the first group to $l$ paths of said second group and for selectively enabling one of the crosspoint gates connecting said corresponding path of the third group to $l$ paths of said second group in each position, each control circuit comprising a crosspoint gate memory for storing codes to determine the enabling of the crosspoint gates connected to said one path and to said corresponding path.

7. A time division switching system wherein $m$ time slots occur in repetitive frames, each time slot being divided into a plurality of bit intervals and each bit interval being divided into n positions according to claim 6 wherein each crosspoint gate memory includes m codes, each code having $n \log_2 l$ bits, means for reading out said codes sequentially from said memory, one code being read out at the beginning of each time slot, and means responsive to the code readout from said crosspoint memory at the beginning of a time slot for selectively controlling the enabling of each crosspoint gate associated with said one path and each crosspoint gate associated with the corresponding path during said time slot.

8. A time division switching system wherein $m$ time slots occur in repetitive frames, each time slot being divided into a plurality of bit intervals, and each bit interval being divided into $n$ positions according to claim 7 wherein said selectively controlling means further comprises one crosspoint register connected between a crosspoint gate memory and each crosspoint gate of said first crosspoint gating means for controlling the operation of said crosspoint gate, another crosspoint register being connected between said one crosspoint register and the crosspoint gate associated with the corresponding path for controlling the operation of said crosspoint gate associated with the corresponding path.

9. A time division switching system wherein $m$ time slots occur in repetitive frames, each time slot being divided into a plurality of bit intervals and each bit interval being divided into $n$ positions according to claim 8 wherein each crosspoint register comprises a recirculating register of $n$ stages for sequentially applying control information to the connected crosspoint gate in each bit interval during a time slot.

10. A time division switching system wherein $m$ time slots occur in repetitive frames, each time slot being divided into a plurality of bit intervals and each bit interval being divided into $n$ positions according to claim 7 wherein each time division path comprises means for transposing $n$ positions of one bit interval into an arbitrarily designated sequence of $n$ positions in the next succeeding bit interval.

11. A time division switching system wherein $m$ time slots occur in repetitive frames, each time slot being divided into a plurality of bit intervals and each bit interval being divided into $n$ positions according to claim 10 wherein the transposing means of one input time division path is paired with the transposing means of one output time division path, and further comprising control means connected to each of said paired transposing means, said control means comprising a memory for storing transposition control codes to control the operation of both said input time division path transposing means and said output time division transposing means in each bit interval, and means connected between said control memory and each of the connected transposing means for applying control signals corresponding to said control code in each bit interval to each of said connected transposing means.

12. A time division switching system wherein $m$ time slots occur in repetitive frames, each time slot being divided into a plurality of bit intervals and each bit interval being divided into $n$ positions, a first group of $j$ input time division paths, a second group of $k$ intermediate time division paths, a third group of $j$ output time division paths, $j \leq k$, a first crosspoint gating network connected between said first and second groups for selectively transferring information bits from the time division paths of said first group to the time division paths of said second group in each position, a second crosspoint gate network connected between said second group and said third group for selectively transferring information bits from the time division paths of said second group to the time division paths of said third group in each position, a first plurality of control circuits, each associated with one path of said first group for selectively enabling the crosspoint gates connecting said one path of the first group to $k$ paths of the second group, a second plurality of control circuits each associated with one path of said third group for selectively enabling one of the crosspoint gates connecting one path of the third group to $k$ paths of the second group in each position, each control circuit comprising a crosspoint gate memory for storing codes to determine the enabling of the crosspoint gates connected to the path associated with the crosspoint gate memory, each crosspoint gate memory including means for storing $m$ codes, each code having $n \log_2 k$ bits.

13. A time division switching system comprising first and second groups of time division paths, each path being adapted to transmit interleaved PCM codes in repetitive frames of $m$ time slots, each time slot being divided into a plurality of bit intervals and each bit interval being divided into $n$ channels whereby $n$ PCM codes are transmitted in each time slot, a crosspoint gate network connected between said first group and said second group for selectively transferring PCM code bits from the time division paths of said first group to the time division paths of said second group in each channel, and control means for selectively enabling said crosspoint means in each channel, said control means comprising a control memory for each path of the group having the lesser number of paths, said control memory comprising means for storing $m$ control codes, each code determining the selective enabling of the crosspoints of said control memory path for one of said $m$ time slots, each code having $n \log_2 l$ bits where $l$ is the number of paths in the group having the greater number of paths.

* * * * *